(12) United States Patent
Henkel et al.

(10) Patent No.: US 6,347,573 B1
(45) Date of Patent: Feb. 19, 2002

(54) PISTON CYLINDER UNIT HAVING AN ADJUSTABLE STROKE LENGTH

(75) Inventors: Walter Henkel; Ines Kistenbrügger, both of Koblenz (DE)

(73) Assignee: Stabilus GmbH, Koblenz (DE)

( * ) Notice: Subject to any disclaimer, the term of this patent is extended or adjusted under 35 U.S.C. 154(b) by 0 days.

(21) Appl. No.: 09/676,004

(22) Filed: Sep. 29, 2000

(30) Foreign Application Priority Data

Oct. 1, 1999 (DE) .......................... 199 47 489
Sep. 22, 2000 (DE) .......................... 100 46 961

(51) Int. Cl.[7] ............................... F15B 15/24
(52) U.S. Cl. .................................... 92/13.51
(58) Field of Search .................... 92/13.51, 165 PR

(56) References Cited

U.S. PATENT DOCUMENTS 3,815,480 A * 6/1974 Spyra ..................... 92/13.51
4,595,182 A   6/1986 Freitag et al. ............. 267/120

FOREIGN PATENT DOCUMENTS

DE    3301544    7/1984
DE    3826862    2/1990
DE    4022145    1/1992

* cited by examiner

*Primary Examiner*—F. Daniel Lopez
*Assistant Examiner*—Michael Leslie
(74) *Attorney, Agent, or Firm*—Baker Botts L.L.P.

(57) ABSTRACT

A piston-cylinder unit with an adjustable stroke length includes a cylinder having an axis, a closed end and a rod end, a piston rod supported in the rod end of the cylinder in sealed and sliding relation, and a piston received on the piston rod for axial movement relative to the piston and received in the cylinder for axial movement relative to the cylinder. A threaded connections is provided between the piston rod and the piston. A stop surface on the side of the piston facing the rod end of the cylinder and a counterstop surface associated in fixed relation with the cylinder and facing the closed end of the cylinder are engaged when the rod is extended from the cylinder to a full stroke length position. Upon such engagement the piston is held rotationally fixed to the cylinder such that upon rotation of the cylinder about the axis, the piston is rotated relative to the piston rod and is moved axially along the piston rod by the threaded connection such as to change the stroke length.

10 Claims, 1 Drawing Sheet

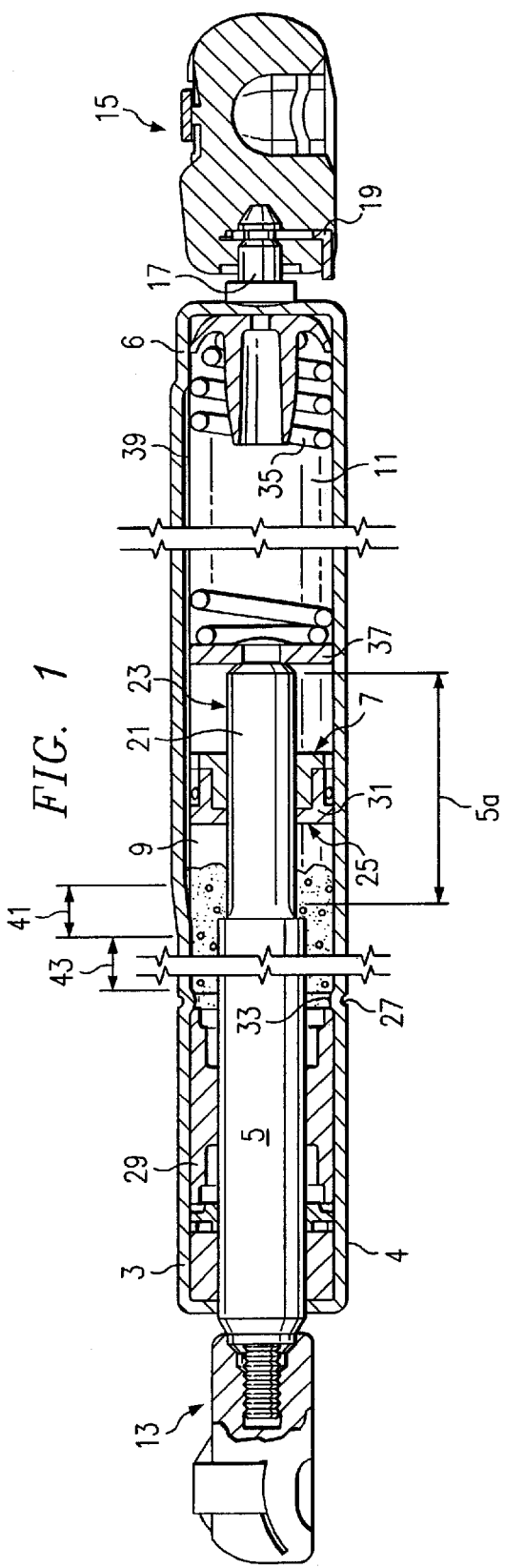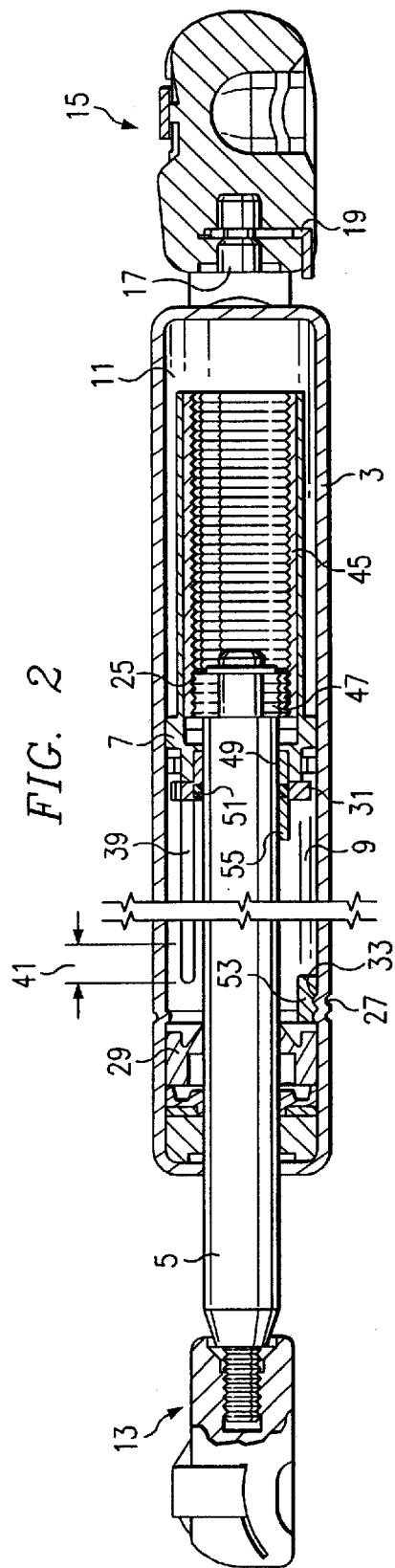

PISTON CYLINDER UNIT HAVING AN ADJUSTABLE STROKE LENGTH

BACKGROUND OF THE INVENTION

The present invention relates to piston-cylinder units, such as gas springs, in which the length of the working stroke of the piston can be adjusted continuously (infinitely) within a predetermined range of adjustment.

There are numerous practical applications for piston-cylinder units in which it is advantageous to be able to adjust the length of the working stroke of the piston (hereinafter "stroke length"), such as to adapt a standard piston/cylinder unit for use in different specific installation conditions. In principle, the stroke length can be established by special valve designs of the piston-cylinder unit. In this regard, reference may be made to DE 33 01 544 A1. In a piston-cylinder unit of the type disclosed in DE 33 01 544 A1, the piston rod automatically travels out to a specific stopping point and can then, by overcoming a blocking valve, arbitrarily assume a new stopping position in a second opening region. Generally, the function is reliably performed. A disadvantage of that approach is that the special valve makes the product more expensive to produce.

In a piston-cylinder unit according to either DE 40 22 145 A1 or DE 38 26 862 A1, the stroke length adjustment can be set by way of a stop sleeve having several stop faces located at different positions axially of the cylinder. The piston rod, together with the piston, is rotated relative to the cylinder of the piston-cylinder unit, so that the piston rests on a desired stop face that defines a stroke length. A disadvantage of multiple stop faces is that only a limited number of stroke lengths are possible, inasmuch as the size of each stop face must be kept large enough to avoid compression contact stresses in excess of a strength limit.

SUMMARY OF THE INVENTION

An object of the present invention is to provide a piston-cylinder unit in which the stroke length is adjustable continuously throughout a predetermined range of adjustment and that can be manufactured at relatively low cost, is reliable in operation, is easy to adjust, and is durable.

The foregoing object is attained, according to the invention, by a piston-cylinder unit having an adjustable stroke length that includes a cylinder having an axis, a closed end and a rod end, a piston rod supported in the rod end of the cylinder in sealed and sliding relation, and a piston received on the piston rod for axial movement relative to the piston rod and received in the cylinder for axial movement relative to the cylinder. A threaded connection is provided between the piston rod and the piston. A stop surface on the side of the piston facing the rod end of the cylinder and a counterstop surface associated in fixed relation with the cylinder and facing the closed end of the cylinder are engaged when the rod is extended from the cylinder to a full stroke length position. Upon such engagement the piston is held rotationally fixed to the cylinder such that upon rotation of the cylinder about the axis, the piston is rotated relative to the piston rod and is moved axially along the piston rod by the threaded connection such as to change the stroke length.

The threaded connection between the piston and piston rod allows for simple and inexpensive manufacture, provides reliable operation for stroke length adjustment, and permits continuous (infinite) adjustments of the stroke length within the range allowed by the length of the threaded portion of the piston rod.

In preferred embodiments, the stop and the counterstop have interlocking profile surfaces, such as corrugations or teeth, that are engageable with one another such as to inhibit rotation of the piston relative to the cylinder upon adjustment of the stroke length.

The threaded connection between the piston and the piston rod may be provided by external threads formed directly on the piston rod and internal threads formed directly on a portion of a body of the piston. Alternatively, the threaded connection is provided by external threads on a sleeve affixed to a body of the piston and external threads on a flange affixed to the piston rod. In the latter case, the body of the piston has an opening through which the piston rod is received and by which the piston is guided along the piston rod upon adjustment of the stroke length. Advantageously, a seal is provided between the opening in the piston and the piston rod.

In one arrangement for damping the outward movement of the piston rod at the end of the outward working stroke, a limit cup is received in the rod end of the cylinder, and a displacer is provided on the piston that moves into the limit cup near the end of the outward stroke of the piston rod. The damping effect at the end of the working stroke is the same, regardless of the adjusted stroke length. The counterstop may be associated with the limit cup.

According to other refinements of embodiments of the present invention, the cylinder may have at least one bypass groove, which connects the two working spaces separated by the piston as a function of piston position. In association with the stroke length adjustment feature according to the present invention, the characteristics of the bypass remain the same, regardless of the stroke length setting. For example, the piston movement may be damped near the end of the outward travel, and such damping is available and uniform for all stroke lengths.

It is known that the spring force characteristic of gas springs may be favorably altered to attain a desired load profile by the use of one or more compression springs within the cylinder. For this purpose, a piston-cylinder unit according to the present invention may include an axially fixed support ring on the end of the piston rod nearer the closed end of the cylinder and a mechanical compression spring engaged between the closed end of the cylinder and the support ring and applying a force to the piston rod regardless of the stroke length setting.

DESCRIPTION OF THE DRAWINGS

For a more complete understanding of the present invention, and the advantages thereof, reference may be made to the following written description of exemplary embodiments, taken in conjunction with the accompanying drawings.

FIG. 1 is a schematic axial cross-sectional view, portions of which are broken away, of a first embodiment in which the piston-cylinder unit is a gas spring; and FIG. 2 is a schematic axial cross-sectional view, portions of which are also broken away, of a second embodiment, which is likewise a gas spring.

DESCRIPTION OF THE EMBODIMENTS

A piston rod 5, which carries a piston 7, is supported in sealed and guided relation in a rod end 4 of a cylinder 3 for axial movements. The cylinder 3 has a closed end 6 and is filled with a pressure medium. The piston 7 separates the cylinder 3 into a rod-end working space 9 and a closed-end working space 11. The closed end 6 of the cylinder 3 and the end of the piston rod 5 located outside the cylinder each are fitted with a coupling member 13, 15. The coupling member 13 is rotationally fixed on the piston rod. The cylinder can be rotated relative to the coupling member 15. To that end, the cylinder has a connecting pin 17 that coacts with a securing clamp 19.

A portion 5a of the piston rod 5 adjacent the end within the cylinder has integrally formed external threads 21 which form a threaded connection 25 with internal threads formed on a portion of the piston 7. Hence, the axial position of the piston on the piston rod in the portion 5a can be adjusted continuously (infinitely) within the portion 5a by rotation of the piston relative to the piston rod. The position of the piston on the piston rod determines the maximum stroke length of the gas spring, since the piston also serves as a stop at the full extension position of the piston rod. The maximum stroke length adjustment is calculated by subtracting the axial length of the internal threads on the piston that form the threaded connection 25 from the axial length of the threaded portion of the piston rod 5a.

The end of the working stroke of the piston 7 in the travel-out direction of movement of the piston rod 5 is limited by a counterstop 27, which in a very simple design may be an internal bead formed by a reduction in diameter of the cylinder, for example a corrugation. Alternatively, the end of a piston-rod guide tube 29 that faces the piston or a separate axially secured counterstop disk or tube may serve as the counterstop.

For adjustment of the axial position of the piston on the piston rod, the piston rod is allowed to extend out of the cylinder until the piston engages the counterstop 27. Owing to interlocking profiled end surfaces 31 and 33 that mate with one another, (e.g., corrugated or toothed surfaces) on the piston 7 and the rod guide 29, when the stop of the piston and the counterstop of the cylinder are in engagement, positive mechanical locking against rotation of the cylinder relative to the piston is attained. If the cylinder is rotated with the piston thus fixed to the cylinder in the circumferential direction, the piston is axially displaced along the threaded section 5a of the piston rod. Mechanical interlocking faces forming the stop and counterstop are not absolutely necessary for axial displacement, but adjustment of the piston is facilitated by such surfaces.

A compression spring 35 may optionally be arranged within the cylinder in the closed end working space 11 in order to obtain a desired spring force characteristic. In application of the gas spring as a lifting aid for a vehicle tailgate, the lifting region in which the compression spring is operative should be independent of the maximum stroke length setting.

In order for this requirement to be met, the piston rod has an axially stationary spring support 37. In this case a disk is used. It is alternatively possible, however, for the spring to be supported directly on an end face of the piston rod.

Alternatively to or in combination with the compression spring 35, the cylinder may have a bypass groove 39, which may be configured to provide a variety of throttle cross sections along its axial extent. Frequently, a run-out portion 41 is located near the end of the bypass groove located in the rod-side working space, so that the travel-out motion is damped at the end of the working stroke. Because of the axial adjustment of the stop on the piston, a constant damped stroke length portion 43 is always uniformly maintained, regardless of the adjusted stroke length, since the distance from the run-out portion to the counterstop is likewise constant.

FIG. 2 shows a modification of the embodiment of FIG. 1, in which the threaded connection 25 for axial displacement of the piston relative to the piston rod is provided between an adjusting sleeve 45 with internal threads that is integral with or affixed to a piston body 7' and a screw flange 47 with external threads that is affixed to the piston rod 5. The adjusting sleeve extends from the piston body axially into the working space 11 remote from the piston rod.

The piston body 7' has a cylindrical internal guide surface 49 for the piston rod. The guide surface centers the piston body radially on the piston rod and permits axial displacement of the piston body relative to the piston rod. A seal 51 between the internal surface 49 of the piston body and the external surface of the piston rod 5 prevents a passage of indefinite size—i.e., the passage provided by clearance in the threaded connection 25 in the embodiment of FIG. 1—from being present between the piston and the piston rod, which could exert a non-uniform throttling effect on the pressure medium in the cylinder upon motion of the piston/piston rod along the cylinder.

The distance between the coupling 13 and the stop 31 on the piston 7 may be varied by means of the adjusting sleeve 45, this distance corresponding to the maximum working stroke of the piston along the cylinder. Engagement of the stop 31 on the piston with the counterstop 27 on the piston rod guide 29 (or on some other part that is stationary with respect to the cylinder 3) limits the extent of movement of the piston rod out of the cylinder.

When the stop 31 on the piston is engaged with the counterstop 27 on cylinder, the piston is linked rotationally to the cylinder. By rotating the cylinder about its axis, the threaded connection 25 between the screw flange 47 and the adjusting sleeve 45 moves the piston 7 axially relative to the piston rod 5. When the desired maximum stroke length (rod extension) of the piston-cylinder unit has been reached, the rotation of the cylinder is stopped. The adjustment may be effected when the piston-cylinder unit is installed between a stationary part, for example, a car body, and a movable part, for example, a vehicle tailgate, since the cylinder 3, with its connecting pin 17, is able to rotate within the coupling member 15.

The maximum variation of the stoke length of the piston rod corresponds to the length of the threads on the adjusting sleeve 45, less the length of the screw flange 47.

In the embodiment of FIG. 2, as in the embodiment of FIG. 1, the position of the piston relative to the outlet 41 of the bypass 39 remains unchanged, regardless of the adjusted stroke length. The limit damping of the outward movement of the piston/piston rod, which is formed by the run-out portion 41 of the bypass groove 39 and the decreasing throttle cross section associated with it and determines the rate of flow of pressure medium between the two working spaces, may, as shown in the lower part of FIG. 2, also be obtained by providing a limit cup 53 in the working space 9 at the rod end of the cylinder and a displacer 55 affixed to the piston and arranged to enter the limit cup near the end of the rod-out movement of the piston. A radial slot between the outside diameter of the displacer and the inside diameter of the limit cup likewise constitutes a throttling arrangement, which provides for a damped limit stop at the end of the working stroke of the piston rod. The limit cup 53 may form the counterstop 27 and may have a profiled surface 33 for positively linking the piston to the cylinder rotationally. The embodiment of FIG. 2 may have a compression spring 35 (see FIG. 1).

What is claimed is:

1. A piston-cylinder unit having an adjustable stroke length, comprising
 a cylinder having an axis, a closed end and a rod end,
 a piston rod supported in the rod end of the cylinder in sealed and sliding relation,
 a piston received on the piston rod for axial movement relative to the piston rod and received in the cylinder for axial movement relative to the cylinder,
 a threaded connection between the piston rod and the piston,
 a stop surface on a side of the piston facing the rod end of the cylinder, and
 a counterstop surface associated in fixed relation with the cylinder and facing the closed end of the cylinder,
 the stop surface being engageable with the counterstop surface when the rod is extended from the cylinder to a full stroke length position and upon such engagement the piston being held rotationally fixed to the cylinder such that upon rotation of the cylinder about the axis, the piston is rotated relative to the piston rod and is moved axially along the piston rod by the threaded connection to change the stroke length.

2. The piston-cylinder unit according to claim 1 wherein the stop and the counterstop have interlocking profile surfaces engageable with one another such as to inhibit rotation of the piston relative to the cylinder upon adjustment of the stroke length.

3. The piston-cylinder unit according to claim 1 wherein the threaded connection is provided by external threads formed directly on the piston rod and internal threads formed directly on a portion of a body of the piston.

4. The piston-cylinder unit according to claim 1 wherein the threaded connection is provided by external threads on a sleeve affixed to a body of the piston and external threads on a flange affixed to the piston rod.

5. The piston-cylinder unit according to claim 4 wherein the body of the piston has an opening through which the piston rod is received and by which the piston is guided along the piston rod upon adjustment of the stroke length.

6. The piston-cylinder unit according to claim 5 wherein a seal is provided between the opening in the piston and the piston rod.

7. The piston-cylinder unit according to claim 1, and further comprising a limit cup received in the rod end of the cylinder and a displacer on the piston that moves into the limit cup near the end of the outward stroke of the piston rod so as to damp the outward motion of the piston rod near the end of the outward stroke.

8. The piston-cylinder unit according to claim 7, wherein the counterstop is associated with the limit cup.

9. The piston-cylinder unit according to claim 1, and further comprising an axially fixed support ring on the end of the piston rod nearer the closed end of the cylinder and a mechanical compression spring engaged between the closed end of the cylinder and the support ring and applying a force to the piston rod regardless of the stroke length setting.

10. The piston-cylinder unit according to claim 1 wherein the cylinder has at least one bypass groove which connects two working spaces in the cylinder separated by the piston as a function of the piston position.

* * * * *